United States Patent [19]

Haess et al.

[11] Patent Number: 5,524,270
[45] Date of Patent: Jun. 4, 1996

[54] SYSTEM FOR TRANSFERRING DATA BETWEEN ASYNCHRONOUS DATA BUSES WITH A DATA BUFFER INTERPOSED IN BETWEEN THE BUSES FOR SYNCHRONIZATION OF DEVICES TIMED BY DIFFERENT CLOCKS

[75] Inventors: Juergen Haess, Sindelfingen; Rolf Hilgendorf, Boeblingen, both of Germany

[73] Assignee: International Business Machines Corporation, Armonk, N.Y.

[21] Appl. No.: 66,694

[22] Filed: May 21, 1993

[30] Foreign Application Priority Data

Jun. 13, 1992 [EP] European Pat. Off. ............. 92109990

[51] Int. Cl.⁶ ........................... G06F 1/12; G06F 13/00; G06F 13/20
[52] U.S. Cl. ................. 395/880; 395/250; 395/550; 395/878; 395/881; 375/354; 375/357; 364/228; 364/239; 364/239.7; 364/919; 364/950; 364/950.1
[58] Field of Search ................................. 395/275, 550, 395/250, 821, 878, 880, 881; 375/106, 108

[56] References Cited

U.S. PATENT DOCUMENTS

| | | | |
|---|---|---|---|
| 4,868,735 | 9/1989 | Moller et al. | 364/200 |
| 4,984,194 | 1/1991 | Hogberg | 364/900 |
| 5,016,219 | 5/1991 | Nolan et al. | 365/195 |
| 5,121,480 | 6/1992 | Bonke et al. | 395/250 |
| 5,128,970 | 7/1992 | Murphy | 375/106 |
| 5,150,313 | 9/1992 | Van den Engh et al. | 364/569 |
| 5,179,667 | 1/1993 | Iyer | 395/275 |
| 5,193,193 | 3/1993 | Iyer | 395/725 |
| 5,197,126 | 3/1993 | Harrell | 395/200 |
| 5,224,213 | 6/1993 | Dieffenderfer | 395/250 |

FOREIGN PATENT DOCUMENTS

| | | |
|---|---|---|
| 0395210 | 10/1990 | European Pat. Off. . |
| 2616729 | 11/1977 | Germany . |

OTHER PUBLICATIONS

IBM TDB, vol. 32, No. 10A, Mar. 1990, pp. 345–348, "Method of Data Synchronization on an Asynchronously Clocked Interface".

Primary Examiner—Thomas C. Lee
Assistant Examiner—Rehana Perveen Krick
Attorney, Agent, or Firm—Arthur J. Samodovitz

[57] ABSTRACT

A system buffers first and second data buses having asynchronous, different frequency clocks. The system comprises a data buffer interposed between the first and second data buses to receive data from the first bus and supply data to the second bus. The also comprises a write address generator, coupled to the first bus to receive a data available signal and coupled to the data buffer, for generating an address in the data buffer to store the data received from the first bus. The data available signal increments the write address generator. A load record register is coupled to receive an indication that data is being written from the first data bus into the data buffer, and tracks locations in the data buffer which have received data from the first data bus. A read address generator is coupled to the data buffer, and generates an address of the next data, if any, that is stored in the data buffer to be read onto the second data bus. A conversion and comparison circuit is coupled between the read address generator and the load record, and determines if the address in the data buffer generated by the read address generator contains data to be read onto the second data bus, and if so, enables transmission of the data at the address to the second data bus and enables incrementing of the read address generator when or after said data is read to the second data bus.

11 Claims, 4 Drawing Sheets

5,524,270

SYSTEM FOR TRANSFERRING DATA BETWEEN ASYNCHRONOUS DATA BUSES WITH A DATA BUFFER INTERPOSED IN BETWEEN THE BUSES FOR SYNCHRONIZATION OF DEVICES TIMED BY DIFFERENT CLOCKS

BACKGROUND OF THE INVENTION

The invention relates to a data buffering system in a computer or digital communication system, and deals more particularly with a data buffer between two data buses.

A computer system comprises in most cases bus systems and bus architectures with different characteristics. Such bus systems or bus architectures have, for instance, different clock and transfer frequencies, operate synchronously or asynchronously, have a different number of lines, a different data flow width, and also a different length. They are connected to each other in a data processing system by coupling circuits and, if necessary, by buffers with interface circuits. The coupling circuits themselves may also comprise buffers for adapting the speed differences of the different bus systems or buses. For transferring, for example, data in a computer system from one bus to another, for which purpose the first bus is associated with the processor and its storage and the second bus with various input/output devices, the data is initially fed to the coupling circuit and thence, for example, to the associated input/output device terminal, keeping the delay by the coupling circuit to a minimum.

Data buffers with a so-called ping-pong data buffer mechanism for transferring data within a computer system from one data bus to another are known, for example, from the European patent application 0 416 281 A2. This mechanism contains a dual port storage mechanism consisting of a storage array and two independent ports, with each port having its own separate data buses, address buses and control buses, as well as the circuits associated therewith. In this known data buffer, the write circuit is coupled to an independent port for receiving data from one of the data buses, in order to write this data into the first part of the storage array. The read circuits in this buffer are coupled to the other independent ports for simultaneously reading from the second part of the storage array, with the read data being transferred to the other data bus. In conjunction therewith, an operating control logic is described which is capable of performing the read and write functions for the first and the second part of the storage array in both directions. In addition, a circuit example is described, wherein a pair of a dual port storage mechanism serves to transfer data, and wherein the first bus has a larger data width and the second bus has a smaller data width.

Furthermore, IBM TDB, Volume 27, No. 1A, June 1984, pp. 334 to 337, describes a circuit arrangement which also comprises a data buffer between two different data bus systems. Although this article describes a typical solution to the problem of how data may be transferred between two data bus systems with different characteristics, the use of a dual port buffer is relatively elaborate from a technical point of view. The control circuits described also involve a large number of technical circuit means.

Therefore, it is the object of the invention to provide a control circuit and an operating method for a buffer of a data or information processing system, wherein the data buses or data bus systems to be connected to each other through the data buffer have different clock frequencies and other different characteristics.

Another object is to improve the type of write address pointer employed—also implemented as a load counter in a circuit—, i.e. the use of the code, its generation, and the resetting of the pointer, considering that the clock pulse sequences of the two buses are not interconnected.

SUMMARY OF THE INVENTION

The invention resides in a system for buffering first and second data buses having asynchronous, different frequency clocks. The system comprises a data buffer interposed between the first and second data buses to receive data from the first bus and supply data to the second bus. The also comprises a write address generator, coupled to the first bus to receive a data available signal and coupled to the data buffer, for generating an address in the data buffer to store the data received from the first bus. The data available signal increments the write address generator. A load record register is coupled to receive an indication that data is being written from the first data bus into the data buffer, and tracks locations in the data buffer which have received data from the first data bus. A read address generator is coupled to the data buffer, and generates an address of the next, data, if any, that is stored in the data buffer to be read onto the second data bus. A conversion and comparison circuit is coupled between the read address generator and the load record, and determines if the address in the data buffer generated by the read address generator contains data to be read onto the second data bus, and if so, enables transmission of the data at the address to the second data bus and enables incrementing of the read address generator when or after said data is read to the second data bus.

The environment in which the buffering system according to the present invention is used may employ a faster clock in the write portion of the buffer (for example, 20 ns period) than in the read portion (for example, 27 ns period). The two clock sequences are not interconnected and their values may change in response to technical development. Thus, the transition between the write and the read portion is not synchronous but asynchronous. The read portion can scan the write address pointer at any time even if the latter is being updated. For a binary coded pointer, all of the eight possible combinations may arise during the transition from 011 to 100, which, of course, may lead to a variety of faulty interpretations and control processes. As the period for which the pointer remains unchanged is normally not long enough to permit two scanning operations by the slower read portion, the code selected is such that a single scan operation yields a definite result in each case; in the worst case, the old content or, normally, the new incremented value. Thus, in the worst case, there is a delay of only one cycle, which is insignificant. The generation of the "data available" signal by this circuit is so fast that for a cycle of, say, 27 nanoseconds a latch circuit for synchronization may be metastable for a maximum period of 20 nanoseconds without jeopardizing the function. The selected code also ensures that during scanning one latch circuit as a maximum may become metastable. The operation of the buffer is such that it is read as soon as possible and rewritten only after the entire content has been read. Therefore, the read portion starts the resetting of the address pointer, terminating this operational mode only after the latch circuits for the synchronization of the address pointer, e.g. in the form of a load counter, have been reset.

BRIEF DESCRIPTION OF THE FIGURES

The invention is described in detail below with reference to drawings which illustrate examples, in which.

DETAILED DESCRIPTION OF THE PREFERRED EMBODIMENTS

Figure 1:
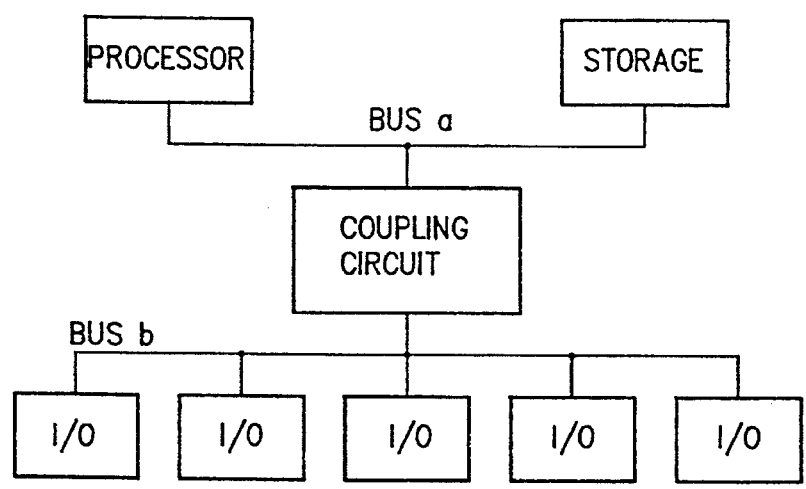
FIG. 1 is a block diagram of a buffer with the associated control circuits.

For performance reasons, bus systems with a synchronous operating protocol are frequently used in a computer system of FIG. 1. As the number of lines, the width or extension of such buses are limited, such a system is provided in most cases with several buses having different cycle times. They are interconnected by coupling circuits and, if necessary, by buffers with interface circuits.

Data in such a composite structure is transferred in the form of blocks of different length, although there is a defined maximum length. The coupling circuits may also comprise buffers for adapting speed differences on the buses to be connected.

FIG. 1 shows a computer system with two buses a and b. The processor and its storage are connected to bus a and various input/output devices I/O's to bus b.

Data to be output from the storage is initially fed to the coupling circuit and thence to the I/O terminal. The delay by the coupling circuit should be minimal.

Figure 2:
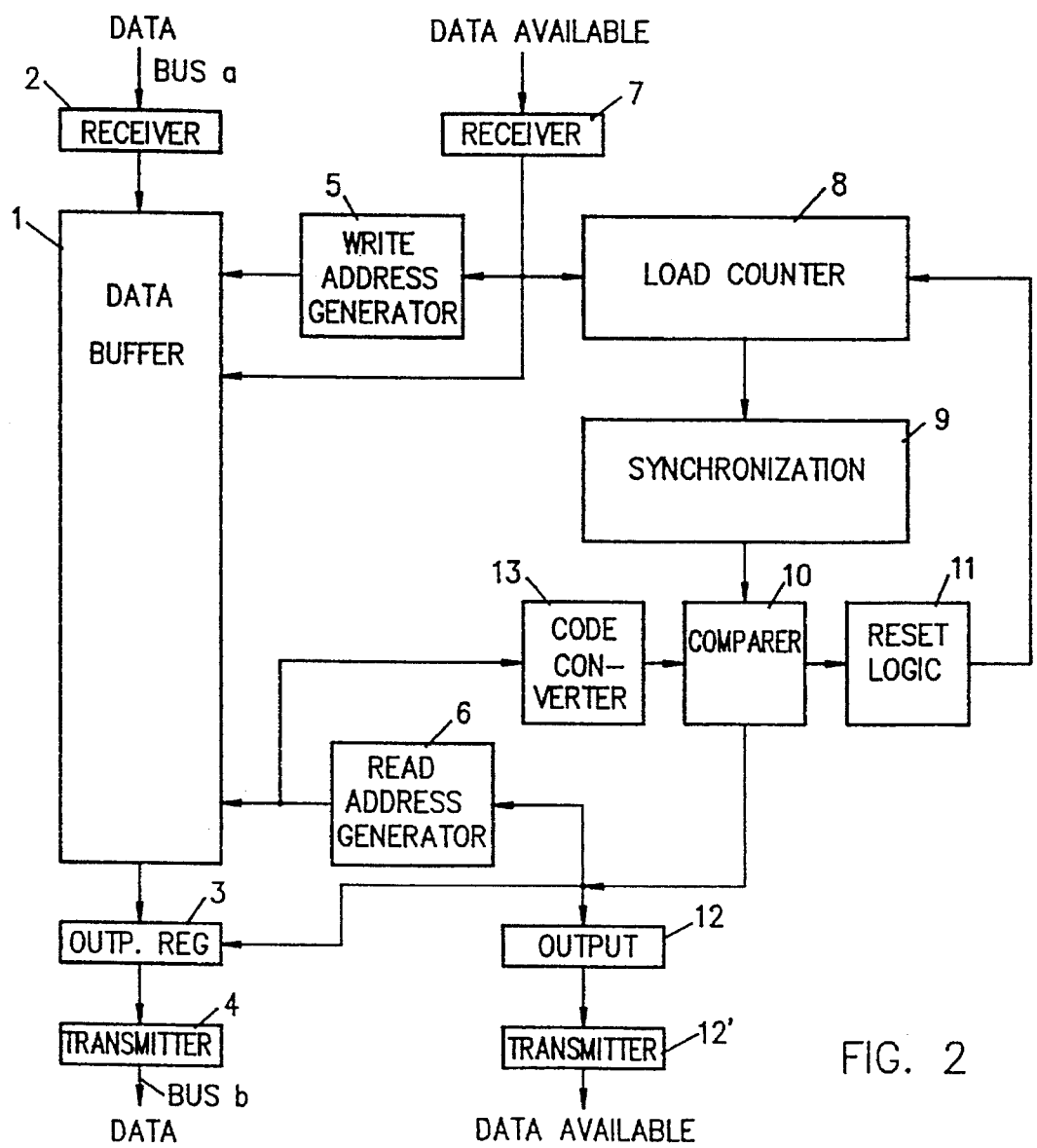
FIG. 2 is a detailed block diagram of a control circuit for the data buffer.

FIG. 2 shows the block diagram of a buffer with the associated access logic circuit of a coupling circuit.

The data flow and the operation of the circuit diagram of FIG. 2 are described in detail below.

The central component of the data flow from the computer system of FIGS. 1 and 2 is the data buffer 1 which receives from bus a the data to be transferred to bus b.

This data buffer is controlled by two logic blocks. At the top (bus a) by the write address generator circuit 5 which increments the write storage address and the load counter 8 in response to the receipt of further data. This load counter 8, an essential component of the present invention, operates with a special code which in the connected synchronization logic 9 is converted at high speed and glitch-free into the clock system at the bottom (bus b) of FIG. 2.

At the bottom, the data buffer is controlled by a logic circuit 6 which generates a read address. This address is converted into a code comparable to that in the load counter 8 and then compared by a comparer 10 with the content of the latter, which is latched in the synchronization buffer 9. The result of this comparison controls the output 3, 4 of the data buffer 1 and the output register 12 which then signalizes "data available".

Additionally, the reset logic 11 generates a reset signal which conditions the data buffer 1 for the transfer of the next data block.

The circuit of FIG. 2 essentially consists of a data buffer 1 with a receiver 2 for data and an output register 3 which is followed by a transmitter 4 for data output. The output register 3 is not required for each of the possible implementations of the circuit. The data buffer 1 is controlled by the write address generator circuit 5 and the read address generator circuit 6. The write address generator circuit 5 receives "data available" control signals through a receiver 7 as well as from a load counter 8. The load counter 8 is followed by a synchronization circuit 9 which in turn has its output side connected to a comparer 10. The output of the comparer 10 is fed through a reset logic 11 to the load counter 8 and to an output register 12, the read address generator 6 and the output register 3 of the data buffer 1. The comparer 10 additionally receives an input signal from the read address generator circuit 6 through a code circuit 13. Depending upon the respective application, the "data available" signal appears at the transmitter 12' which follows the output register 12.

Figure 3:
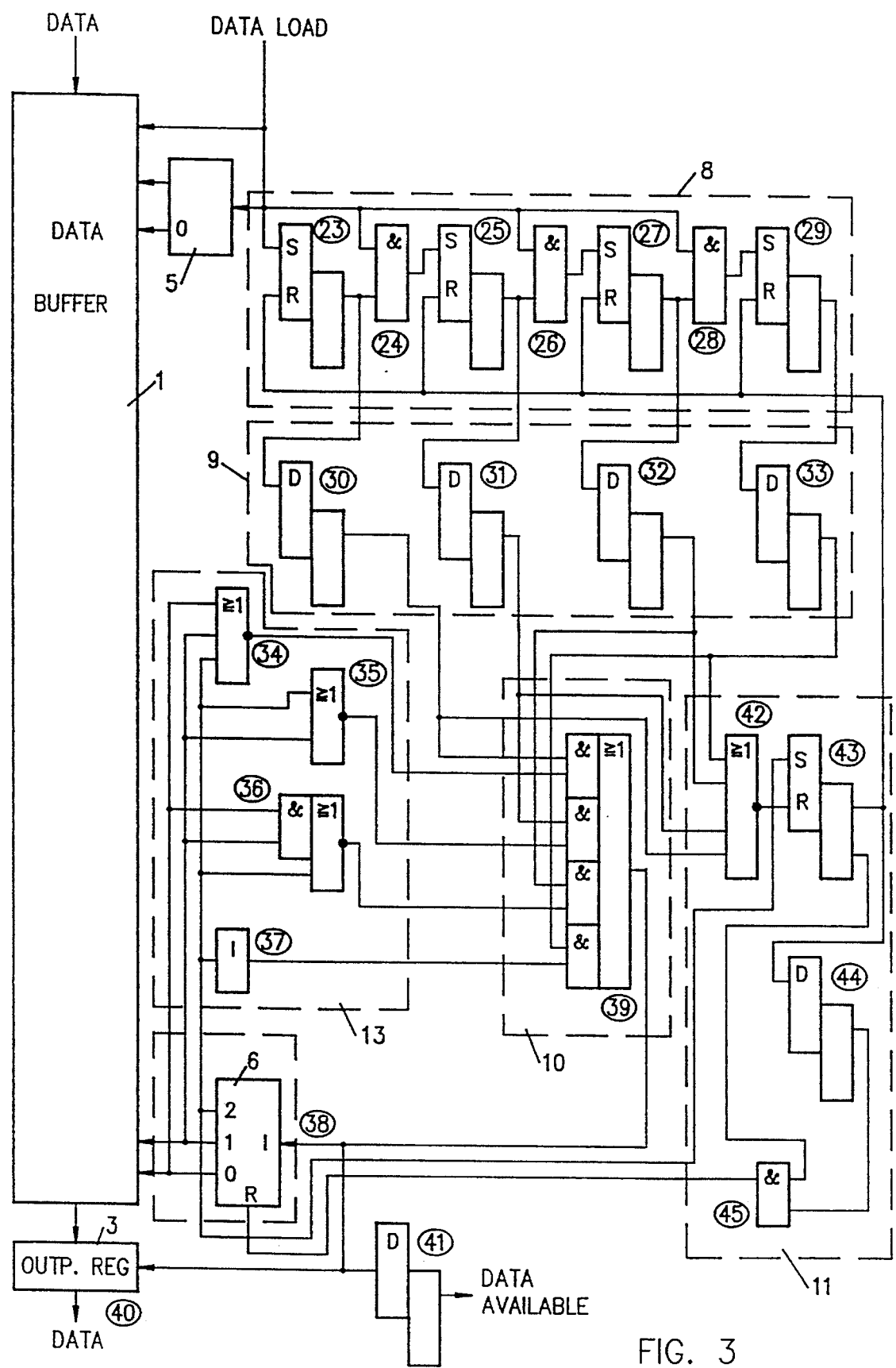
FIG. 3 is an implementation of a control circuit for the buffer.

It is assumed that the data buffer 1 of FIG. 3, which has a predetermined data width, is capable of storing up to four words. The data items or words to be loaded are made available by a "data load (b)" signal. Loading may take place each cycle or, for example, with a gap of up to 20 cycles between two successive words. The write pulse for the signal (b) is used to increment the load counter 8 as well as the write address or the pointer. At the beginning of each operation, the read address, the write address and the load counter 8 are in the output or the reset state. As the read address is in the reset state, the logic circuits 34 to 37 in FIG. 3 emit the signal "1" at their outputs. When the "data load (b)" signal changes to the active state, for instance for one cycle, data is stored at the address 0 of the data buffer 1. After the clock pulse, the write address is incremented and the latch circuit 23 is set. Latch circuit 30 is also set as soon as the associated clock pulse is applied. Thus, one of the basic conditions for circuit 39 is fulfilled, so that the latter becomes active. The output register 3 is ready and in response to the next clock pulse, the data stored therein is fed to output 40. The same clock pulse increments the read address 38 and sets the latch circuit 41 to "1". The incrementation changes the address bit 0 to "1", so that the complementary switch signal is available at the output of circuit 34. Unless "data load" signals have since been received, AND-circuit 39 returns to the deactivated state, i.e. in other words it remains active if further "data load" signals are received. The "data load" pulse sets the latch circuit 25 followed by latch circuit 27. The clock pulse in the assumed 27 nanosecond range then sets latch circuit 31 and possibly also latch circuit 32. The latch circuits in the 27 nanosecond range become metastable when their data input changes too close in time relative to the clock pulse. As long as the AND-circuit 39 is active, data is read from the data buffer 1. After the fourth word has been read, the last bit of the read address becomes active, which triggers the last AND-function at AND-circuit 39, and latch circuit 43 is set. The output signal of latch circuit 43 causes the latch circuits 23, 25, 27 and 29 to be reset. In addition, the latch circuit 44 is set. After the load counter 8 has been reset, the latch circuits 30 to 33 of the synchronization circuit 9 follow with their associated clock signal. Thus, the condition for circuit 42 is fulfilled and latch circuit 43, which is reset-dominant, is reset. After having been reset, the input signal of circuit 45 is in its true state and a reset request is issued for the read address. Thus, in the next cycle of the circuit a new operation may begin.

Figure 4:
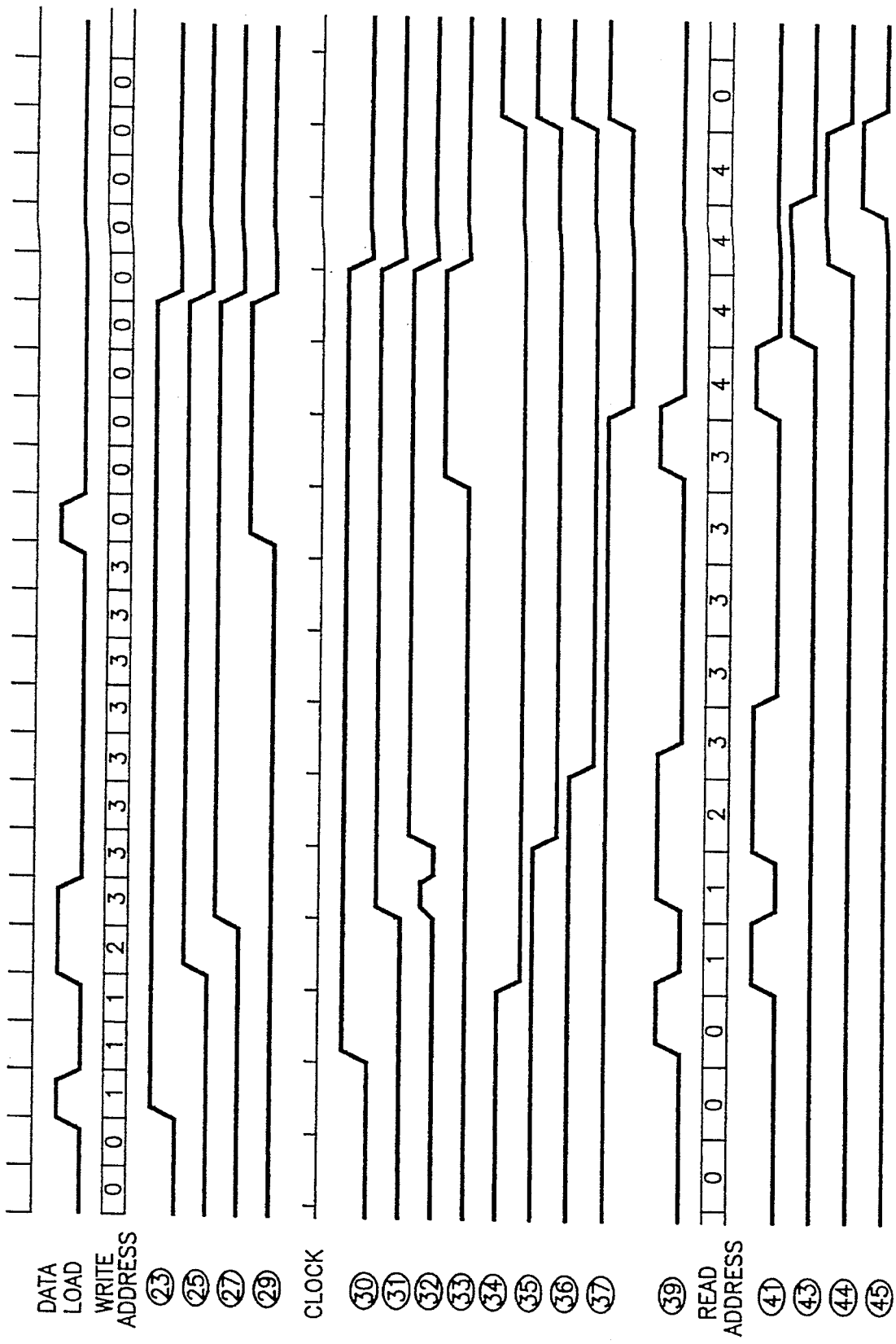
FIG. 4 is a time diagram for the circuit arrangement according to FIG. 3.

The described operation of the circuit arrangement of FIG. 3 is readily understandable from the time diagram of FIG. 4. It is pointed out that the digits in the small circles at the beginning of a line in FIG. 4 appear in a similar fashion at the respective points of the circuit in FIG. 3. Thus, the time diagram of FIG. 4 is readily understandable by means of the circuit of FIG. 3 and its operation. The upper part of FIG. 4 shows the word address at a particular time and the lower part the read address. The subdivision shows quite clearly that the clock frequency in the upper part is higher than in the lower one, i.e. the assumed 20 nanoseconds apply to the write portion and the assumed 27 nanoseconds to the read portion.

Figure 5:
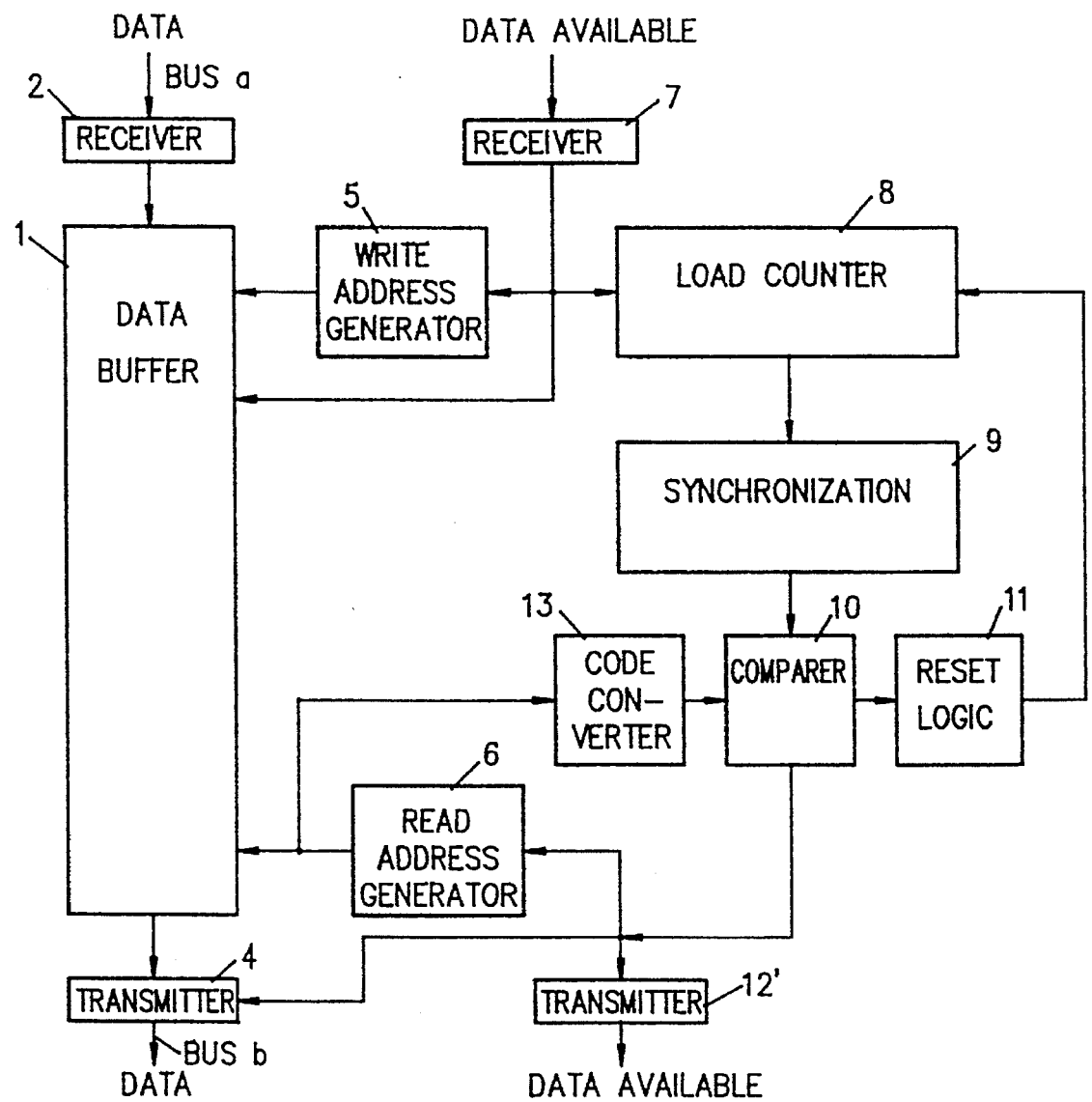
FIG. 5 is a modification of the block diagram of FIG. 2.

FIG. 5 is a modification of FIG. 2, wherein in particular the input/output registers of FIG. 2 have been omitted. This means in other words that control and reading in and out are not effected through separate registers but directly at the receiver 2 and 7, at the transmitter 4 and 12' or at the output of the data buffer. It is also pointed out that in lieu of being implemented as a pure counter circuit, load counter 8 may also take the form of a coded and incrementing register. The converter or code circuit 13 and the comparer may also be designed as a combined circuit. However, such circuit measures have no influence on the concept of the present invention. It is also totally irrelevant what kind of latch circuits or technically equivalent circuits are used for the individual registers or logic circuit stages and counters. As the operation of the circuits of FIG. 5 and FIG. 2 is equivalent, a further detailed description has been omitted.

We claim:

1. Apparatus for transferring data from a first data bus with a first clock to a second data bus with a second, asynchronous clock, said apparatus comprising:

a data buffer interposed between said first and second data buses;

write address generator means, coupled to said first bus to receive a write signal timed by said first clock for incrementing an address in said data buffer to store data from said first bus;

load record means, timed by said first clock and coupled to said write address generator means, for recording a latest address in said data buffer which has received data from said first data bus;

read address generator means, timed by said second clock, for incrementing an address of data last read from said data buffer for said second data bus; and means, timed by said second clock, for sampling an output of said load record means indicating said latest address and comparing said output to the incremented address of said read address generator means, when the sampling is stable, to determine if said buffer currently contains data yet to be read onto said second data bus.

2. Apparatus as set forth in claim 1 wherein after data is read from said data buffer, the sampling and comparing means also sends a signal to said read address generator means to increment said read address generator means again.

3. Apparatus as set forth in claim 1 wherein the sampling and comparing means comprises a synchronization buffer coupled to said load record means, for storing the sampled output of said load record means with timing by said second clock.

4. Apparatus as set forth in claim 3 wherein said load record means comprises a number of stages of latches or flip-flops, and said synchronization buffer comprises said number of stages of latches or flip-flops, and wherein outputs of said stages of said load record means are connected to inputs of respective stages of said synchronization buffer.

5. Apparatus as set forth in claim 1 further comprising an output register interposed between said data buffer and said second data bus; and wherein the sampling and comparing means enables transmission of said data at the incremented address of said read address generator means to said second data bus by enabling said output register to receive said data from said incremented address of said read address generator means, whereby said data is available to said second data bus.

6. Apparatus for transferring data from a first data bus with a first clock to a second data bus with a second, asynchronous clock, said apparatus comprising:

a data buffer interposed between said first and second data buses;

write address generator means, coupled to said first bus to receive a write signal timed by said first clock for incrementing an address in said data buffer to store data from said first bus;

load record means, timed by said first clock and coupled to said write address generator means for recording a latest address in said data buffer which has received data from said first data bus;

read address generator means, timed by said second clock, for incrementing an address of data last read from said data buffer for said second data bus;

means, timed by said second clock, for converting the incremented address of said read address generator means to a form which can be compared to the latest recorded address of said load record means; and means, timed by said second clock, for comparing the converted and incremented address of said read address generator means to the latest recorded address of said load record means to determine if said address in said data buffer stores data yet to be read onto said second data bus; and wherein the converting and comparing means comprises a comparator and a converter, said converter converts the incremented address of said read address generator means to a form which can be compared in the comparator to the latest recorded address of said load record means to determine if said address in said data buffer stores data yet to be read onto said second data bus.

7. Apparatus as set forth in claim 1 wherein said write address generator means and said read address generator means are incremented independently of each other, based on the first and second clocks respectively.

8. Apparatus as set forth in claim 1 wherein said data from said first data bus is stored into a predetermined sequence of addresses in said data buffer, and the sampling and comparing means resets said read address generator means when data from the last of said addresses in said sequence is enabled for reading onto said second data bus.

9. Apparatus as set forth in claim 1 wherein said first clock has a different frequency than said second clock.

10. Apparatus as set forth in claim 1 further comprising means for enabling reading of said data at said incremented address to said second data bus if said incremented address contains data yet to be read onto said second data bus.

11. Apparatus as set forth in claim 1 further comprising:

means for writing said data from said first data bus to said data buffer according to said first clock; and means for reading said data from said data buffer onto said second data bus according to said second clock.

\* \* \* \* \*